United States Patent
Roberts et al.

(10) Patent No.: US 7,616,594 B2
(45) Date of Patent: Nov. 10, 2009

(54) WIRELESS DEVICE DISCOVERY AND CONFIGURATION

(75) Inventors: David A. Roberts, Redmond, WA (US); Amer A. Hassan, Kirkland, WA (US); Abhishek Abhishek, Woodinville, WA (US); Christian Huitema, Clyde Hill, WA (US); Glenn Ward, Seattle, WA (US); Scott A. Manchester, Redmond, WA (US); Noel W. Anderson, Bellevnue, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 11/143,385

(22) Filed: Jun. 2, 2005

(65) Prior Publication Data

US 2006/0239208 A1  Oct. 26, 2006

Related U.S. Application Data

(60) Provisional application No. 60/674,170, filed on Apr. 22, 2005.

(51) Int. Cl.
*H04B 7/00* (2006.01)

(52) U.S. Cl. .............. 370/310; 370/400; 455/41.2; 455/518

(58) Field of Classification Search .............. 370/254, 370/255, 310, 351, 400; 455/41.1, 41.2, 455/41.3, 416, 517, 518, 519
See application file for complete search history.

(56) References Cited

U.S. PATENT DOCUMENTS

| | | | |
|---|---|---|---|
| 6,091,946 A * | 7/2000 | Ahvenainen | 455/411 |
| 6,138,028 A * | 10/2000 | Thoma | 455/466 |
| 6,725,281 B1 | 4/2004 | Zintel et al. | |
| 6,779,004 B1 | 8/2004 | Zintel | |
| 6,892,230 B1 | 5/2005 | Gu et al. | |
| 7,003,282 B1 * | 2/2006 | Ekberg | 455/411 |
| 2002/0027569 A1 | 3/2002 | Manni et al. | |
| 2002/0059434 A1 * | 5/2002 | Karaoguz et al. | 709/228 |
| 2002/0112058 A1 | 8/2002 | Weisman et al. | |
| 2002/0143989 A1 | 10/2002 | Huitema et al. | |
| 2003/0055892 A1 | 3/2003 | Huitema et al. | |
| 2003/0097425 A1 | 5/2003 | Chen | |
| 2003/0117433 A1 | 6/2003 | Milton et al. | |

(Continued)

OTHER PUBLICATIONS

D. Chappell, "Introducing Indigo: An Early Look," (Longhorn Technical Articles) dated Feb. 2005, Microsoft.com Library, 18 pages.

(Continued)

*Primary Examiner*—Quochien B Vuong
(74) *Attorney, Agent, or Firm*—Marshall, Gerstein & Borun LLP

(57) ABSTRACT

A wireless device that desires to be connected to a wireless network broadcasts itself and its capabilities to a network using an information element. The information element is provided with frames, such as management frames, in a channel that is not protected or encrypted. The information element is forwarded to one or more potential registrar devices. One of the registrar devices then provides configuration information to the enrollee, for example as a registrar information element. The configuration information may be passed out of band or in band, and may be passed using cryptography, which may involve public key cryptography, encryption with a PIN, or some other type of secure exchange.

25 Claims, 8 Drawing Sheets

U.S. PATENT DOCUMENTS

| | | | |
|---|---|---|---|
| 2004/0111469 A1 | 6/2004 | Manion et al. | |
| 2004/0111515 A1 | 6/2004 | Manion et al. | |
| 2004/0148333 A1 | 7/2004 | Manion et al. | |
| 2004/0190549 A1 | 9/2004 | Huitema | |
| 2004/0249907 A1 | 12/2004 | Brubacher et al. | |
| 2004/0255029 A1 | 12/2004 | Manion et al. | |
| 2004/0260800 A1 | 12/2004 | Gu et al. | |
| 2005/0004916 A1 | 1/2005 | Miller et al. | |
| 2005/0022210 A1 | 1/2005 | Zintel et al. | |
| 2005/0058096 A1* | 3/2005 | Cheng | 370/329 |
| 2005/0073982 A1* | 4/2005 | Corneille et al. | 370/338 |
| 2005/0074018 A1 | 4/2005 | Zintel et al. | |
| 2005/0083846 A1* | 4/2005 | Bahl | 370/236 |
| 2005/0091529 A1 | 4/2005 | Manion et al. | |
| 2005/0097503 A1 | 5/2005 | Zintel et al. | |
| 2005/0108371 A1 | 5/2005 | Manion et al. | |
| 2005/0148321 A1* | 7/2005 | Igarashi et al. | 455/411 |
| 2005/0177715 A1 | 8/2005 | Somin et al. | |

OTHER PUBLICATIONS

D. Box, "Code Name Indigo: A Guide To Developing And Running Connected Systems With Indigo," dated Jan. 2004, MSDN Magazine, 11 pages.

"Peer-to-Peer Infrastructure: Identity Manager Functions," Microsoft, Dec. 2004, http://msdn.microsoft.com/library/en-us/p2psdk/p2p/identit_manager_functions.asp?frame.

The Cable Guy, "Windows Peer-to-Peer Networking: The Cable Guy—Nov. 2003," updated Aug. 5, 2004, Microsoft TechNet, 7 pages.

"Peer-to-Peer Infrastructure: Grouping API Functions," Microsoft, Jun. 2005, http://msdn.microsoft.com/library/en-us/p2psdk/p2p/grouping_api_functions.asp?frame=true.

"Peer-to-Peer Infrastructure: Creating a Group Chat Application," Microsoft, Dec. 2004, http://msdn.microsoft.com/library/en-us/p2psdk/p2p/creating_a_group_chat_application.asp . . . .

"Peer-to-Peer Infrastructure: PeerGroupEnumMembers," Microsoft, Dec. 2004, http://msdn.microsoft.com/library/en-us/p2psdk/p2p/peergroupenummembers.asp?frame=true.

"Teredo Overview," Microsoft Corporation, website, 30 pages available at http://www.microsoft.com/technet/prodtechnol/winxppro/maintain/teredo.mspx, © 2003 Microsoft Corporation. Jan. 1, 2003, updated Jun. 29, 2005.

* cited by examiner

US 7,616,594 B2

WIRELESS DEVICE DISCOVERY AND CONFIGURATION

REFERENCE TO RELATED APPLICATION

This application claims the benefit of U.S. Provisional Application No. 60/674,170, filed Apr. 22, 2005, and incorporated herein by reference.

FIELD OF THE INVENTION

This invention pertains generally to computer systems and, more particularly, to establishing communication with a wireless network.

BACKGROUND OF THE INVENTION

Today, people often use wireless networks within their home so that various electronic devices within the home may communicate with one another without having to wire the devices together. Music, video, financial, and other data are just a few examples of items that may be exchanged through a wireless network.

People utilizing a wireless network often desire secure communications. Data exchange between devices should be protected from eavesdropping and impersonation.

Configuring a device for secure communication is difficult, particularly for media-specific settings, such as access to a Wi-Fi network. As an example, a Wi-Fi device needs Wi-Fi specific settings, such as a service set identifier (SSID), a cryptographic key, and operating channels, to allow the device to connect to a Wi-Fi network. Currently, connection of a typical Wi-Fi device requires a user to manually enter the configuration in the device, which can be a very confusing process. As such, frustrated users often resort to support calls or product returns.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a wireless device that desires to be connected to a wireless network (referred to herein as an "enrollee" device) is both automatically discovered and automatically discovers the network capabilities so that a routine may be run to provide the device with necessary configuration settings. In accordance with an embodiment, the configuration settings are provided by a device that is already connected to the network (referred to herein as a "registrar" device).

In accordance with an embodiment, an enrollee device transmits information about itself and its capabilities to a network using an information element. The information element is provided with frames in a channel that is not protected or encrypted. In accordance with an embodiment, for a Wi-Fi Network (sometimes referred to by its Standard name—IEEE 802.11 or merely 802.11 network), the information element is included with management frames of the Wi-Fi network. Similar management protocols may be used to distribute the information element in networks other than a Wi-Fi network. The information element is directly received and/or forwarded to one or more potential registrar devices. One of the registrar devices then provides the configuration information to the enrollee, for example as a registrar information element. This information element may also be passed through a protocol layer that is not protected or encrypted, such as via management frames in a Wi-Fi wireless network.

The configuration information can be communicated from an enrollee to a registrar via a connection other than Wi-Fi (including but not limited to USB flash, USB cable, Ethernet cable, and a Bluetooth™ connection); this method is called out of band (OOB).

The configuration information can be communicated from an enrollee to a registrar via a Wi-Fi connection using cryptography, which may involve public key cryptography, encryption with PINs, authentication with PINs, or some other type of secure exchange; this method is called in band.

The in-band method may utilize some form of 802.11 management frame, control frame or unencrypted data frame for the enrollee and registrar to communicate information and configuration information.

The configuration information exchange may be used to establish a trusted relationship between the enrollee and the registrar, by passing certificates, password or other shared secret, that other applications can leverage as a pre-arranged secured relationship.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, such programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs, or other electronic devices. The invention may also be employed in distributed computing environments, where tasks are performed by remote processing devices that are linked through a communications network. In a distributed computing environment, programs may be located in both local and remote memory storage devices.

Figure 1:
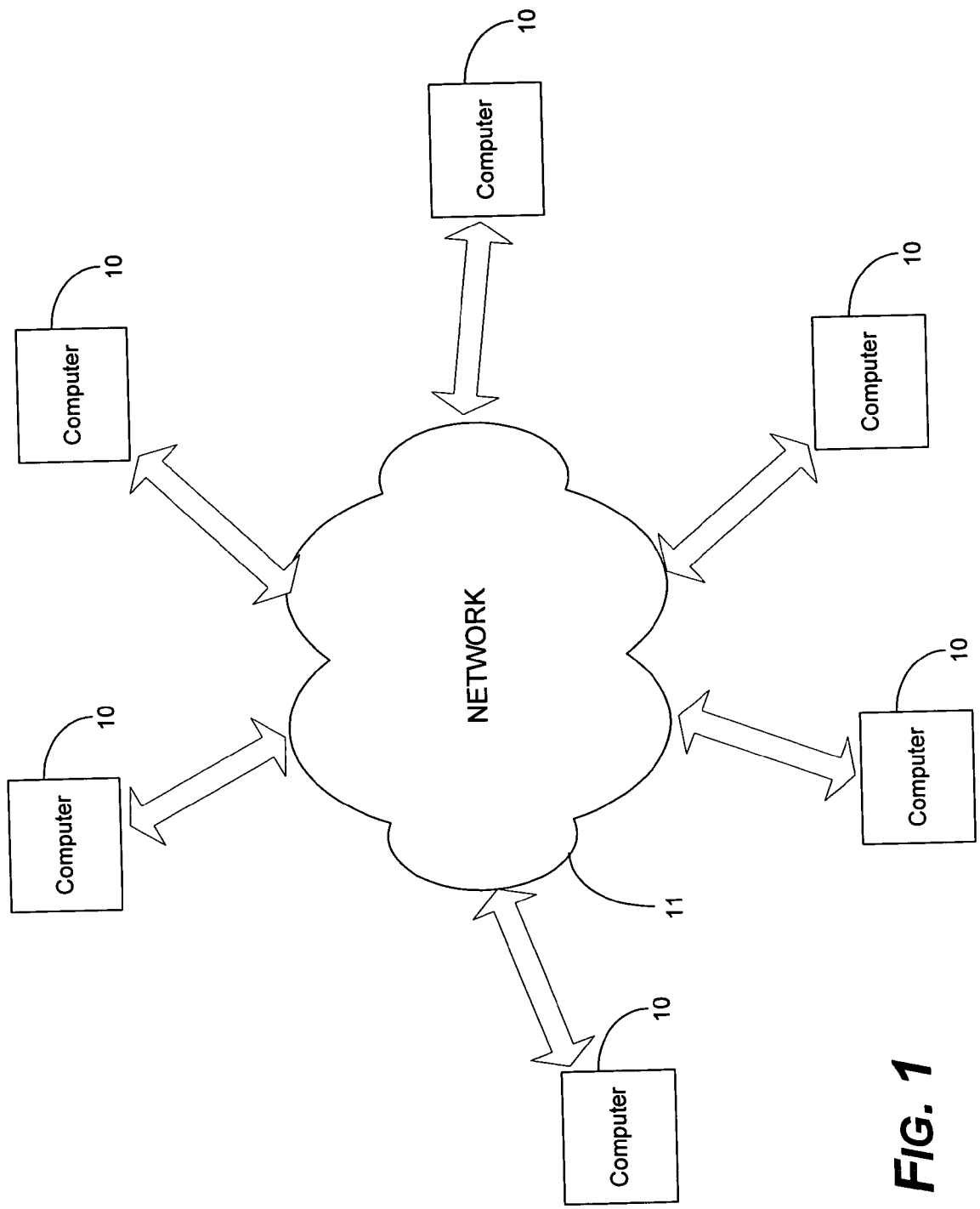
FIG. 1 is a block diagram representing a computer network into which the present invention may be incorporated.

An example of a networked environment in which the invention may be used will now be described with reference to FIG. 1. The example network includes several computers 10 communicating with one another over a network 11, represented by a cloud. The network 11 may include many well-known components, such as routers, gateways, hubs, etc. and allows the computers 10 to communicate.

The present invention has particular application to wireless networks. Thus, for the purposes of this description, the network 11 is presumed to be a wireless network with most computers 10 connected via wireless media, although one or more computers 10 may be connected via wired media.

When interacting with one another over the network 11, one or more of the computers 10 may act as clients, servers or peers with respect to other computers 10. Accordingly, the various embodiments of the invention may be practiced on clients, servers, peers or combinations thereof, even though specific examples contained herein do not refer to all of these types of computers.

Figure 2:
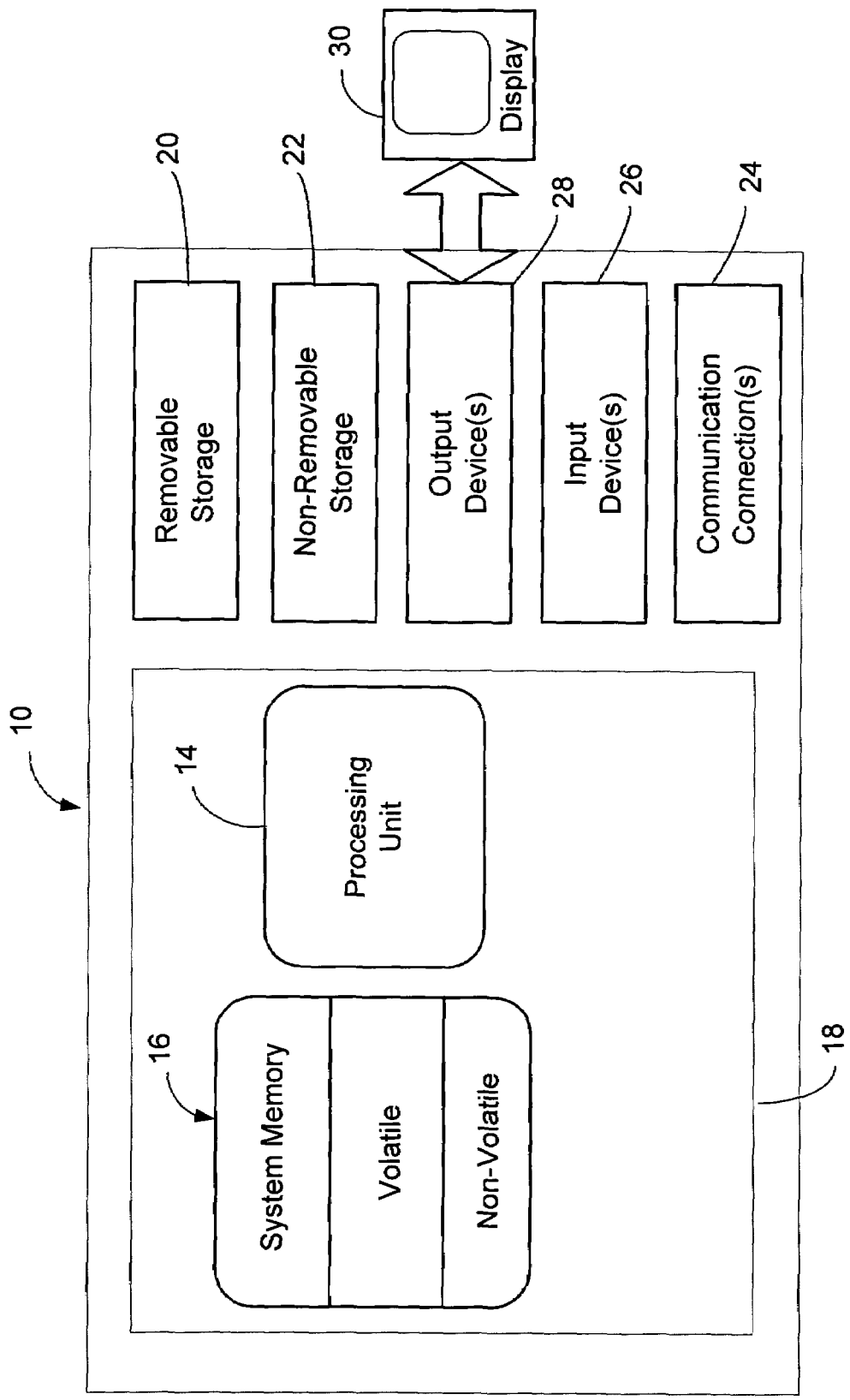
FIG. 2 is a block diagram of an architecture of a computer into which the present invention may be incorporated.

Referring to FIG. 2, an example of a basic configuration for a computer 10 on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18.

The computer 10 may have additional features and/or functionality. For example, the computer 10 may also include additional storage (removable storage 20 and/or non-removable storage 22) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

The computer 10 preferably also contains communications connection(s) 24 that allow the device to communicate with other devices. A communication connection (e.g., one of the communication connections 24) is an example of a communication medium. Communication media typically embody computer readable instructions, data structures, program modules or other data in a modulated data signal such as a carrier wave or other transport mechanism and include any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

The computer 10 may also have input devices 26 such as a keyboard, mouse, pen, voice input device, touch input device, etc. Output devices 28 such as a display 30, speakers, a printer, etc. may also be included. All these devices are well known in the art and need not be discussed at length here.

The present invention has particular application to connection of a new wireless network device to a wireless network, and more specifically to provisioning a wireless network device with information needed to connect to a wireless network. Thus, in accordance with an embodiment, the network 11 shown in FIG. 1 is a wireless network and the computers 10 are devices either connected to, or attempting to connect to, the wireless network 11. As used herein, for ease of reference and not limitation, a device that is connected to a wireless network, either via wired or unwired media, and that is capable of participating in the process described herein is referred to as a "registrar" device, and a device attempting to connect to a wireless network is an "enrollee" device.

Figure 3:
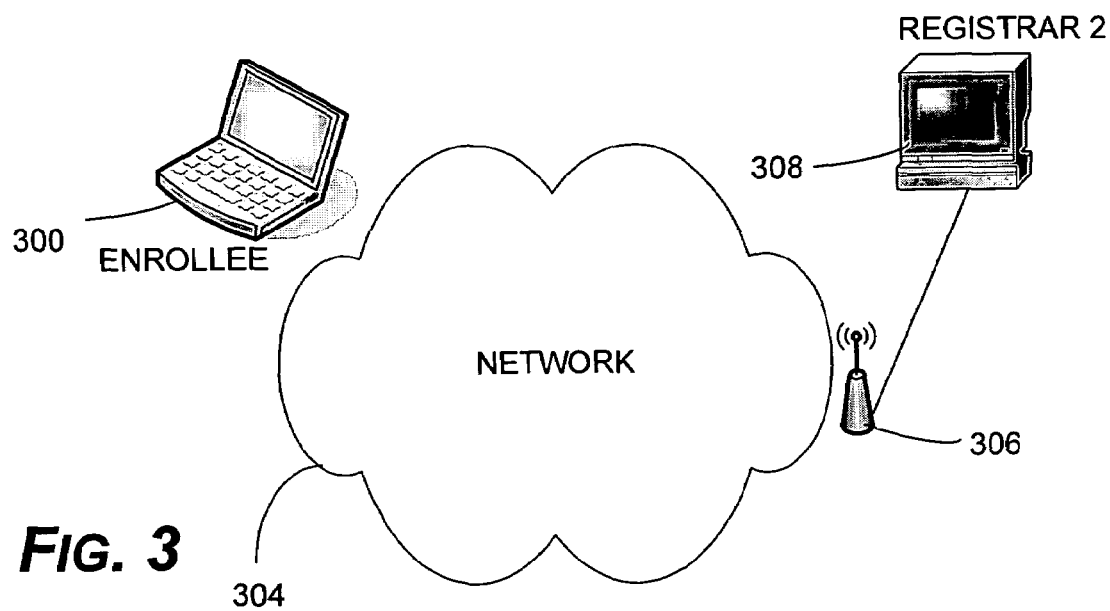
FIG. 3 is a diagram representing an enrollee device attempting a connection to an infrastructure mode wireless network in accordance with an embodiment of the invention.

An example is shown in FIG. 3, where a notebook computer 300 (e.g., one of the computers 10) is an enrollee device and a desktop computer 302 (e.g., also one of the computers 10) is a registrar device. In the embodiment shown in FIG. 3, the registrar device 302 is connected wirelessly to an infrastructure mode wireless network 304 having an access point 306. As is known, infrastructure mode wireless networks, such as the wireless network 304, typically include one or more access points (APs), such as the access point 306, through which a wireless device such as the registrar device 302, may connect to the wireless network. The access point 306 also acts as a bridge between wireless and wired networks. In the embodiment shown in FIG. 3, a second registrar device 308 is provided that is connected to the access point 306 via wired media.

Figure 4:
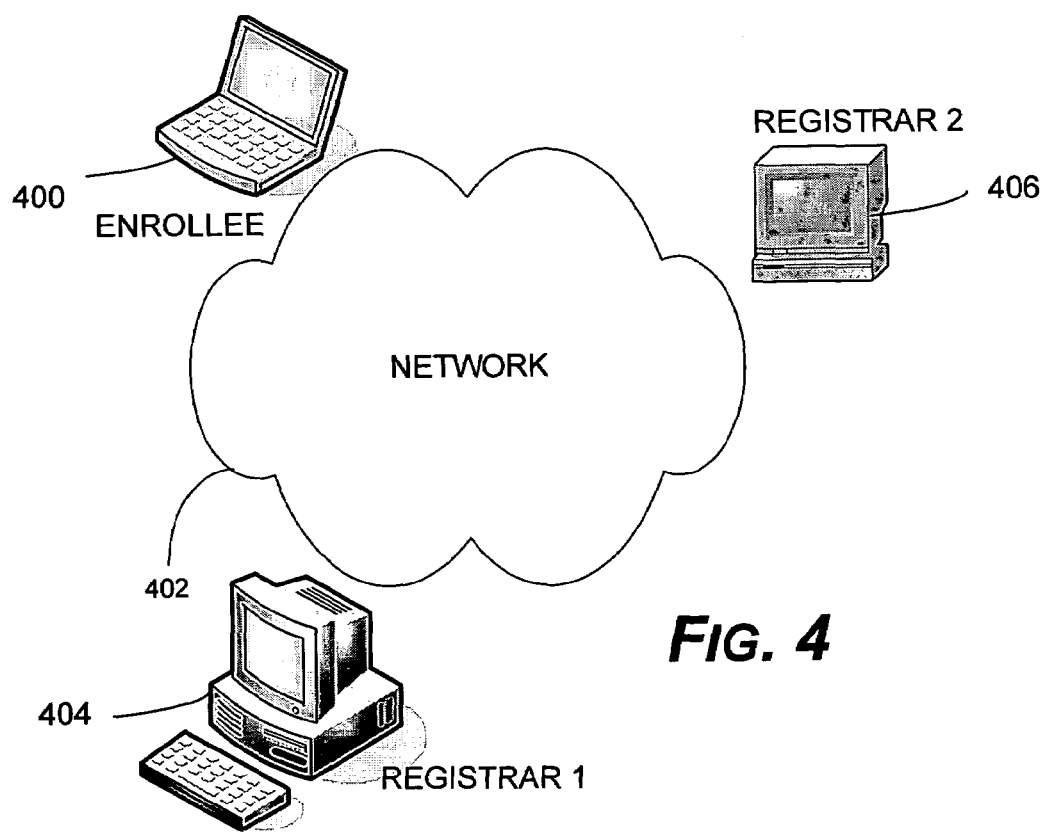
FIG. 4 is a diagram representing an enrollee attempting a connection to an ad hoc wireless network in accordance with an embodiment of the invention.

FIG. 4 shows another example in which an enrollee device 400 is attempting to connect to an ad hoc wireless network 402 having two registrars 404, 406. As is known, an ad hoc network is a transitory association of wireless devices which do not depend upon any fixed support infrastructure, such as an access point or wired media. Connection and disconnection is controlled by the distance among the wireless devices and by willingness to collaborate in the formation of a cohesive, albeit transitory, community. In an embodiment, each willing participant in an ad hoc network is potentially a registrar device.

Figure 5:
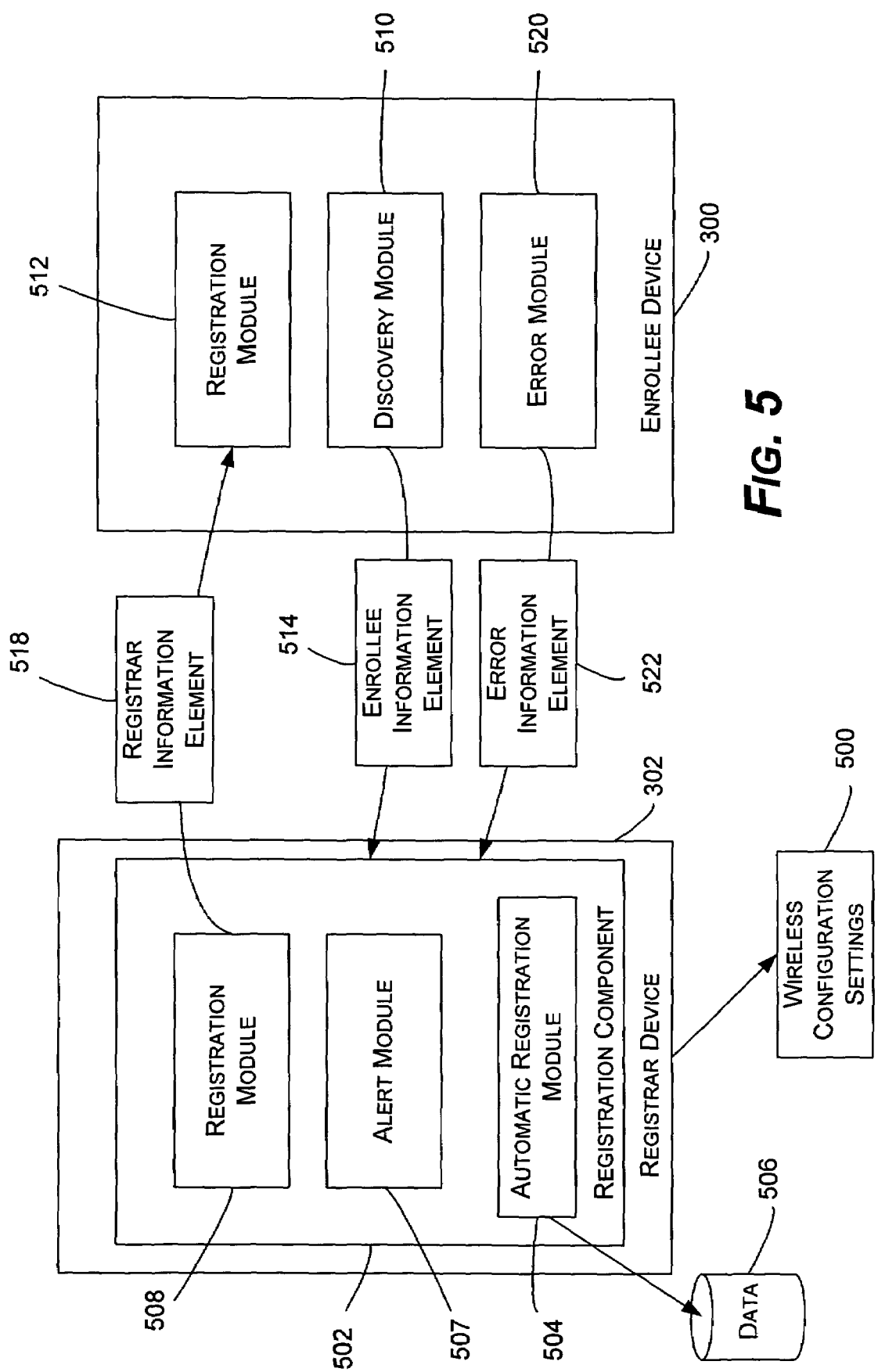
FIG. 5 shows architectures of a registrar device and an enrollee device in accordance with an embodiment of the invention.

FIG. 5 shows architectures of a registrar device, such as the registrar device 302, and an enrollee device, such as the enrollee device 300, in accordance with an embodiment. The registrar device 302 includes or otherwise has access to wireless configuration settings 500 for connecting to a wireless network, such as the wireless network 304. The registrar device 302 also includes a registration component 502. The registration component 502 may include an automatic registration module 504 that is associated with a local or remote database 506. The registration component may also include an alert module 507 and/or a registration module 508. The various modules 504, 507, 508 are utilized for different embodiments of the invention, and all of the modules are not necessarily available on a registrar computer, but instead, a subset of the modules may be available.

The enrollee device 300 shown in FIG. 5 includes a discovery module 510, a registration module 512, and an error module 520. Likewise, these modules are utilized for different embodiments, and not all are necessarily present on an enrollee device 300.

Briefly described, in accordance with an embodiment, the discovery module is configured to broadcast an enrollee information element 514 to a network, such as the network 304 or the network 402. Further information regarding the enrollee information element 514 is provided with the description of FIG. 7, below. The enrollee information element 514 is eventually received by the registrar device 302. The registrar device 302, in turn, returns a registrar information element 518 to the enrollee device 300. The registrar information element 518 is described further with the description of FIG. 8 below. The registration module 512 of the enrollee device 300 utilizes information in the registrar information element 518 to attempt to register the enrollee device 300 with the wireless network.

Figure 6:
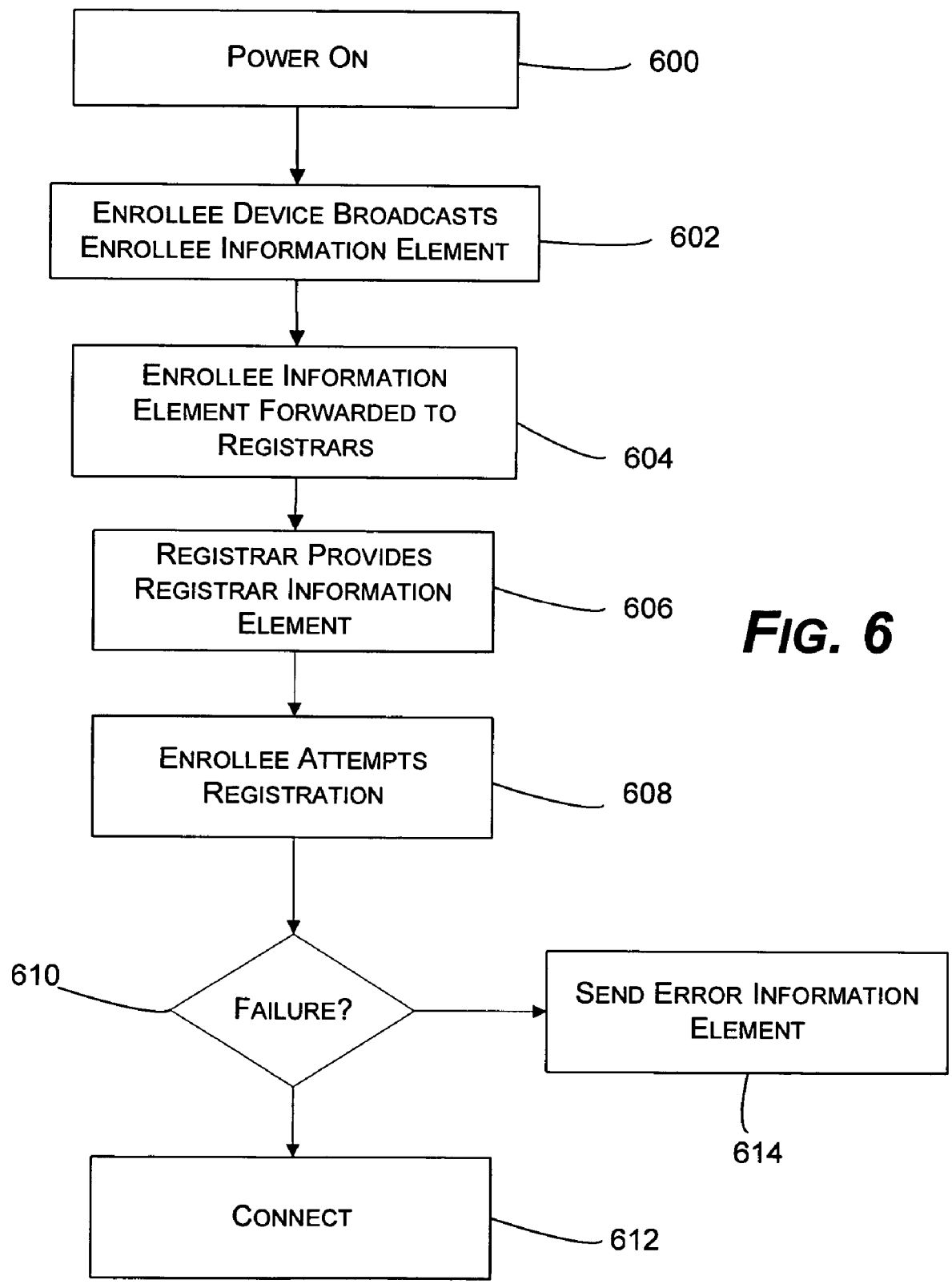
FIG. 6 is a flow chart generally representing steps for enrollee device discovery and configuration in accordance with an embodiment of the invention.

FIG. 6 is a flowchart generally representing steps for discovering and configuring an enrollee device, such as the enrollee device 300 in accordance with an embodiment of the invention. Beginning at step 600, the power for the enrollee device 300 is turned on. At step 602, the enrollee device 300 broadcasts information about itself and its capabilities in the enrollee information element 514. As described above, this may be done, for example, via the discovery module 510. The enrollee information element 514 may be broadcast automatically, or a user may be required to initiate the sequence.

In accordance with an embodiment, the enrollee device 300 broadcasts the enrollee information element 514 utilizing a protocol that is not protected or encrypted, and thus may be passed to other devices on the wireless network to which the device is attempting to connect. As an example, for a Wi-Fi network, a class 1 management frame may be used as the discovery channel. As another example, a temporarily established data connection frames, such as a control frame or other unencrypted data frames may be used.

In an embodiment, the enrollee information element 514 may be included with a probe request of the management frame, may be included with an action frame, or may be presented as a new frame within the management channel. Similar channels may be utilized in other network environments. As an example, in an Ethernet environment, the enrollee information element 514 may be sent as an address resolution protocol (ARP) frame. For internet protocol (IP), an internet control message protocol (ICMP) packet may be used. For WiMAX, one of the dedicated management channels over which Mac protocol data units are sent may be utilized. In any event, in general, the channels through which packets or frames that are typically sent to establish and maintain communications, or to perform other management functions, may be utilized for broadcasting the enrollee information element 514.

Figure 7:
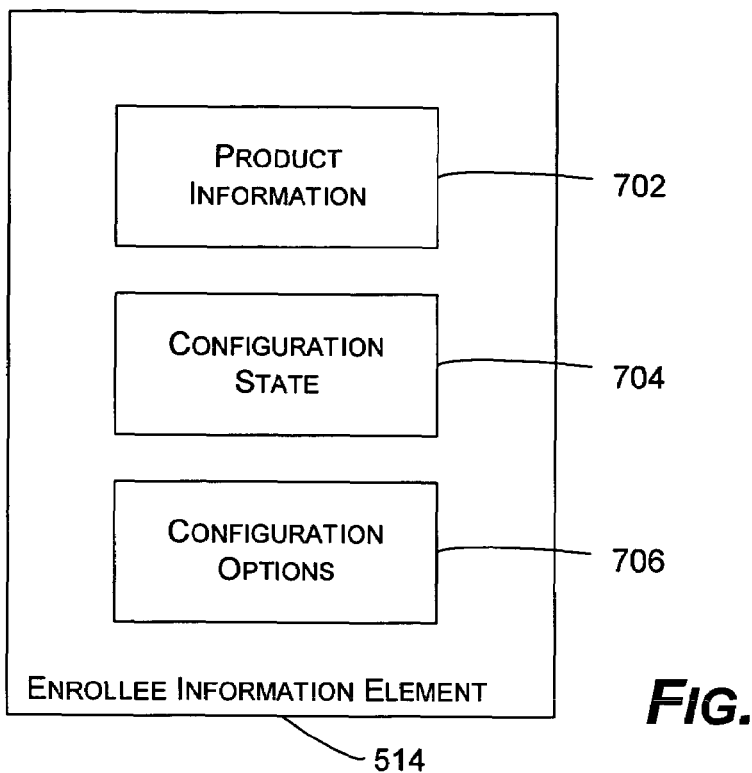
FIG. 7 is a block diagram representing an enrollee information element in accordance with an embodiment of the invention.

FIG. 7 shows an enrollee information element 514 in accordance with an embodiment of the invention. The enrollee information element 514 includes product information 702, configuration state 704, and configuration options 706. The product information 702 may include the make and model of the enrollee device 300, the serial number, media access control (MAC) address, and/or other unique identification information. The configuration state 704 may include whether the enrollee device 300 is new, is trying to re-register because of an error, or another state of the enrollee device 300.

The configuration options include information about ways in which the enrollee device 300 is willing to receive the registrar information element 516. There may only be one option listed, or there may be more than one. The option or options may include out of band exchanges, or in band exchanges utilizing a designated cryptography method.

As one example, the configuration options 706 may designate the process describe in U.S. Patent Application Publication No. 2005/0044372, filed Aug. 21, 2003 and entitled "Physical Device Bonding." That application describes a system or method that facilitates the installation and/or authentication of a device by invoking installation protocols and/or authentication protocols for a non-physical connection. A physical interface component, such as a USB physical interface, provides a physical connection between at least one wireless device and at least one network entity in which the installation protocols and/or authentication protocols can be exchanged. The physical interface component can utilize a token key to establish multiple non-physical connections with multiple wireless devices. Additionally, the physical interface component can utilize a daisy chain scheme to install and/or authenticate a wireless device.

As another alternative for a configuration option, the process disclosed in U.S. patent application Ser. No. 11/026,193, filed Dec. 30, 2004 and entitled "Extensible Architecture for Entrusted Medium Device Configuration via Trusted Medium" may be utilized. In that application, a portable computer-readable media device is used to configure network devices to allow network functionality and connectivity. A configuration application generates, or aids the user in generating, network settings such as wireless configuration settings, LAN settings, and WAN settings. These settings are determined from the operating system or through user input. The configuration application then generates an Extensible Markup Language (XML) file embodying the network settings and writes that file to the portable computer-readable media device. A user may then install the portable computer-readable media device in one or more other network devices to automatically transfer the configuration to those network devices. A wireless device may be provisioned with the wireless configuration settings necessary to join a wireless network, without requiring the user to manually enter the network settings.

Another option for the configuration options 706 is to use a label or a PIN. The PIN and/or label could be encrypted, for example, by Advance Encryption Standard (AES), RC4, RC5, or RC6 symmetrical encryption algorithms, or another encryption algorithm, or used for authentication as a shared secret separately or in conjunction with an encryption algorithm. Proof of knowledge of the PIN may be performed via hashing, challenge/response, gradual knowledge proof or another form of authentication. The configuration options 706 may additionally include public key exchange, the Diffie-Hellman key agreement protocol, or another form of cryptography.

Returning now to FIG. 6, at step 604, the enrollee information element 514 is forwarded to potential registrar devices, such as the registrar device 302. In the case of an infrastructure mode wireless network, such as the wireless network 304, an access point, such as the access point 306, distributes the enrollee information element 514, for example via mechanisms such as Web Services discovery or events, UPnP discovery or events, or as an extension of Topology Discovery. In the example shown in FIG. 3, the registrar device 302 receives the enrollee information element 514 via wired communication through the access point 306. The registration device 308 receives the enrollee information element 514 via a wireless transmission from the enrollee device 300 to the access point 306, and then via wired media from the access point 306 to the registrar device 308. The registrar devices 404, 406 in the ad hoc network 402 in FIG. 4 may receive the enrollee information element 514 directly from the enrollee 400, or the enrollee information element may be forwarded from one of the registrars 404, 406 to the other.

Figure 8:
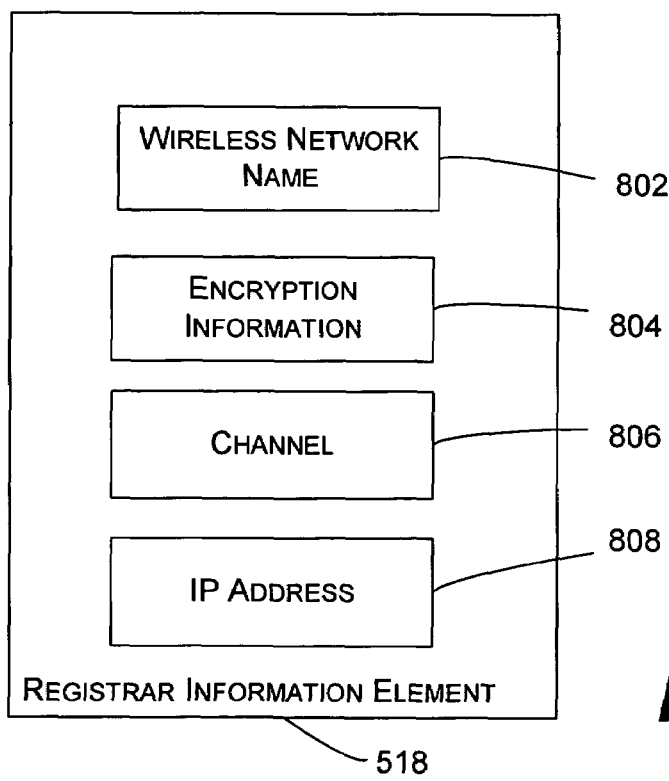
FIG. 8 is a block diagram representing a registrar information element in accordance with an embodiment of the invention.

At step 606, the registrar provides the configuration information to the enrollee. This information may be provided, for example, by providing the registrar information element 518. FIG. 8 shows an example of some components that may be included in the registrar information element 518. In the registrar information element 518 shown in that figure, a wireless network name element 802 is included, which may be, for example, the SSID of the wireless network. The registrar information element 518 also includes encryption information 804, such as an encryption key. A channel 806 and registrar IP address 808 may also be provided in the registrar information element 518.

In an embodiment, the registrar device 302 provides the configuration information to the enrollee in a manner set forth as one of the configuration options 706 of the enrollee information element 514. As such, the registrar information element 518 may be passed out of band, or may be passed in band with encryption, for example via the same channel through which the enrollee information element 514 was broadcast, or may establish a temporary direct data connection with the enrollee for passing the configuration, in accordance with an option provided in the configuration options 706. Of course, if only one option is provided, then that option is utilized. In an embodiment, a default configuration may be used if no options are provided. In such an embodiment, the enrollee device 300 provides information about desiring the default option by not designating a different option, or by not indicating that the default option is not available.

In one embodiment, as a result of receiving the enrollee information element 514, the automatic registration module 504 of the registrar device 302 checks the product information 702 in the enrollee information element 514 against a list of devices in the database 506. If the product information 702 matches one of the devices in the database 506, the registrar device 302 automatically provides the registrar information element 518 or other configuration information that the enrollee device might need for registration to the enrollee device 300 without user input. This automatic registration may occur, for example, for appliances that are installed in the home of the user.

In another embodiment, a registrar device 302 must take positive steps to determine whether or not an enrollee device is requesting configuration information. For example, the registrar device 302 may launch an application, such as the registration component 502, that detects whether an enrollee information element 514 has been broadcast, and if so then handles it according, such as by initiating the sequence for sending the registrar information element 518 via the registration module 508.

Figure 9:
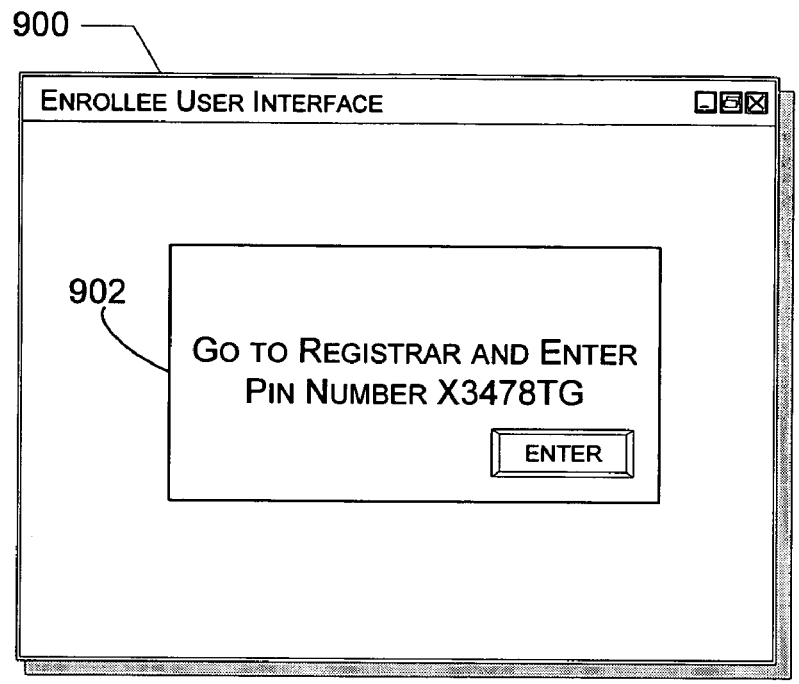
FIG. 9 is a representation of a user interface for an enrollee device in accordance with an embodiment of the invention.

In accordance with another embodiment, an alert is provided at a registrar device, such as the registrar device 302, upon receipt of an enrollee information element 514. An example is provided in FIGS. 9-11, in which an enrollee device 300 includes a user interface 900 (FIG. 9). To begin the discovery process, the user interface 900 provides a dialog box 902 which requests a user to go to a registrar device 302 to enter a personal identification number (PIN). In the embodiment shown, the PIN is provided on the user interface 900, but it may alternatively be stamped or otherwise included on of the enrollee device 300, for example on an outer casing.

Figure 10:
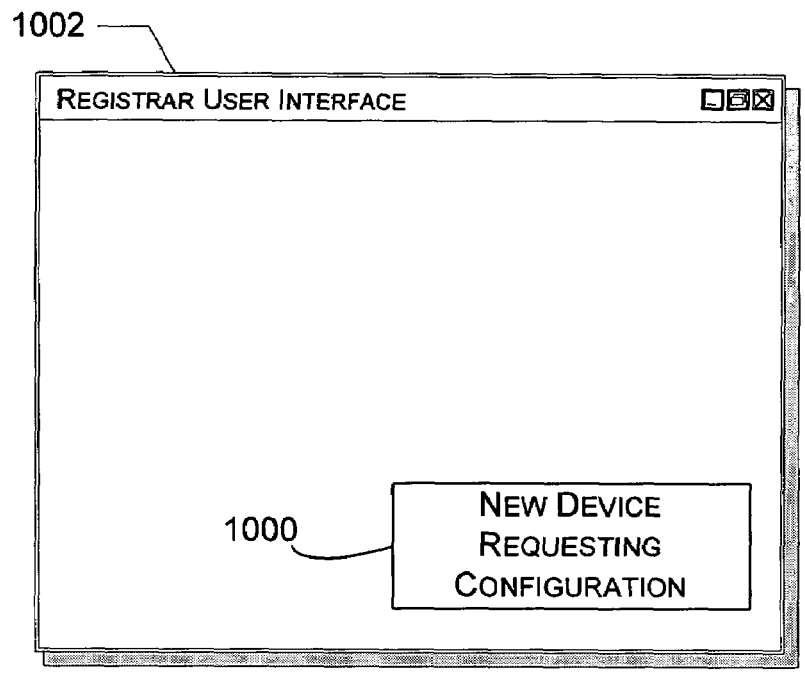
FIG. 10 is a diagram representing a user interface for a registrar device, the user interface showing a bubble message in accordance with an embodiment of the invention.
Figure 11:
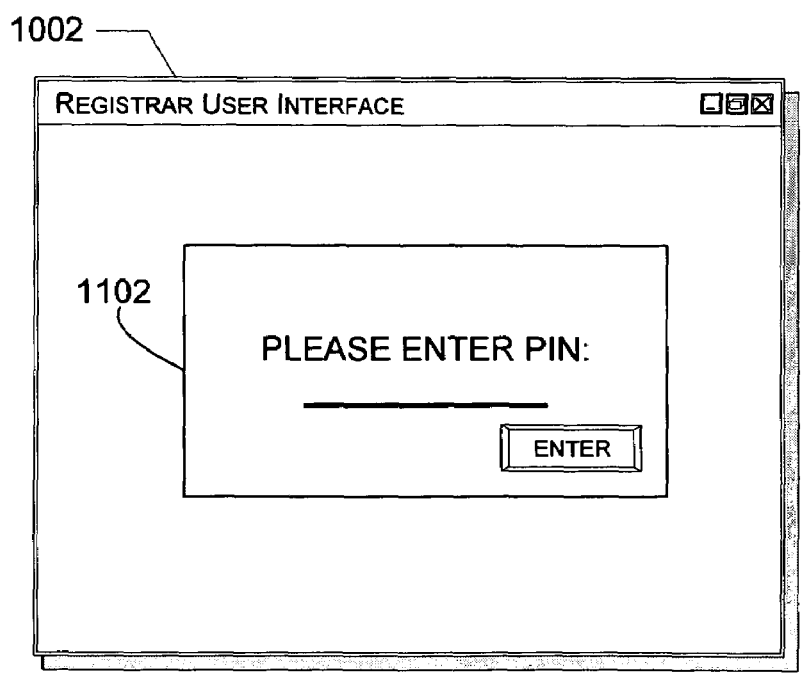
FIG. 11 is a diagram representing a user interface for a registrar device, the user interface requesting a pin in accordance with an embodiment of the invention.

In FIG. 10, in response to the registrar device 302 receiving the enrollee information element 514, the alert module 507 provides a bubble message 1000 on a user interface 1002 of the registrar device 302. The bubble message 1000 indicates that an enrollee device 300 is requesting configuration information. The user may click on or otherwise select the bubble message 1000 and then may be directed to a dialog box 1102 (FIG. 11). In this dialog box 1102, the user is requested to enter the PIN found on, or otherwise supplied by, the enrollee device 300. For example, this PIN may be the PIN provided on the user interface 900 in FIG. 9. Upon providing this PIN, the registration module 508 is prepared to supply the registrar information element 518 in accordance with the configuration options 706.

Once the enrollee device 300 has received the registrar information element 518, at step 608 the enrollee device 300 attempts registration with the wireless network using the configuration information within the registrar information element 518. At step 610, a determination is made whether there is a failure in establishing a connection using the configuration information. If not, step 610 branches to step 612, where the enrollee device connects to the wireless network. If there is a failure, step 610 branches to step 614, where the failure is reported. This failure may be reported, for example, via the error module 520 (FIG. 5) on the enrollee device 300. Reporting may occur, for example, via an error information element 522, which may be broadcast in a manner similar to the enrollee information element 514, described above with reference to step 602. Error codes that may be included in an error information element 522 include, but are not limited to, an invalid key being exchanged, an SSID not being found, and an inability to get an IP address.

Figure 12:
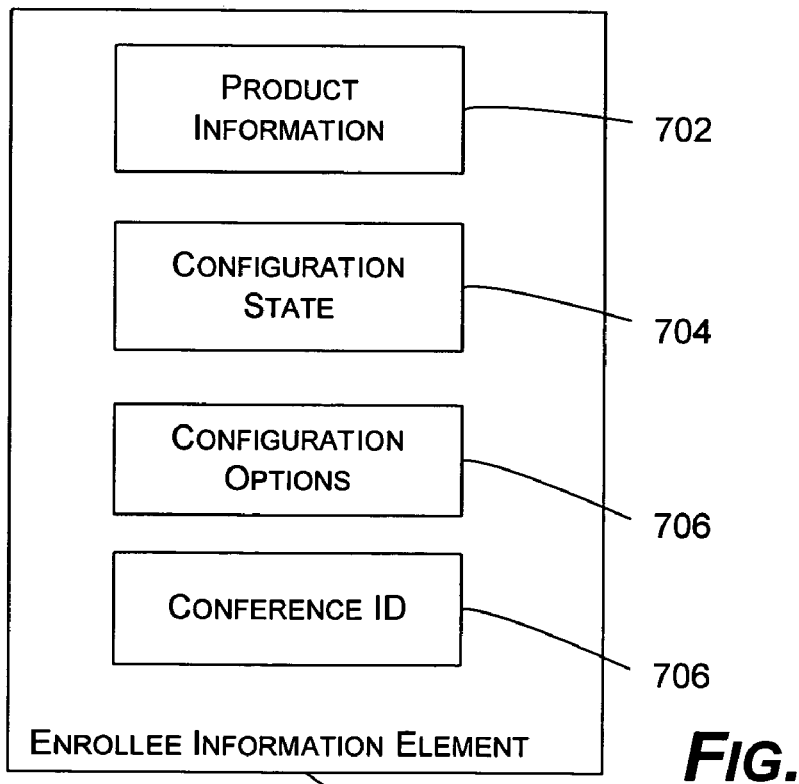
FIG. 12 is a block diagram representing an alternate embodiment of an enrollee information element in accordance with an embodiment of the invention.

In accordance with an embodiment, the process of the invention may be utilized to establish an ad hoc conference. In such a conference, each device that is to participate in the conference is provided an ID prior to the conference. This ID may be, for example, the conference ID 1200 in FIG. 12. The conference ID 1200 is included as part of an enrollee information element 1514, which may include some or all of the information from the enrollee information 514, and/or additional information. Utilizing this enrollee information element 1514, a device may join an ad hoc conference by broadcasting the conference ID. Because each device in the ad hoc conference has possession of the conference ID, the originator of the conference may drop out, and the remaining devices may continue the conference.

Example

A specific example is now given for the benefit of the reader. In this example, the setup of an enrollee device 300 occurs in the context of IEEE 802.11 technology. The registrar device 302 is connected to the network (e.g., the network 304) via an 802.11 access point (e.g., the access point 306). The access point 306 may or may not be configured to act as a registrar device. Also, there may be multiple registrar devices 302 with a mix of the registrar device 300 acting as a proxy for one or more registrar devices.

At first, the enrollee device 300 undergoes a discovery of registrar devices 302 and sets up control channels for communication. To do so, the enrollee device 300 sends a probe request containing an enrollee information element 514. In this example, the probe request header includes: SSID/Desired network (configured desired network name); type of network (infrastructure); and Basic Service Set Identifier (BSSID) broadcasted by the access point 306. The BSSID is included to avoid un-necessary probe responses.

The enrollee information element 514 in this example includes: identifier indicating the probe request is a registrar device discovery request; supported rate set; supported security capability; and information about out of band channel if supported and enabled on enrollee device 300. In addition, the enrollee information element 514 includes a request type field, which indicates whether the discovery request also includes a control channel request. As an example, this may be a bit that is set to 0 for a discovery only request and 1 for discovery as well as control channel setup request. A status code field may also be provided, and for an enrollee information element 514 is set in this example to 0.

Utilizing the probe request of this example has many benefits. For example, the frame exchange sequence for a probe request is supported in the base 802.11 standard, so it is available in all versions of the 802.11 implementation. In addition, probe request frames already carry all other capability information needed to establish direct communication between two wireless devices. In fact, probe request/response is the standard way to exchange capability information and form virtual association between two wireless devices in an ad hoc network Additionally, the probe request frame exchange sequence is highly flexible; i.e., it can be performed anytime and irrespective of the connection state on either wireless device. The probe request frame exchange also performs physical reach ability tests between two wireless devices for direct communication.

The probe request frame exchange also gives a way to completely bypass the access point 306 irrespective of whether the access point 306 is capable of registrar device 302 functions. Finally, use of the probe request frame sequence permits an enrollee device 300 to discover registrar devices 302, and determine the capability of an access point 306 to act as a registrar device with a single probe request message. This information comes handy when a registrar device 302 can not be directly discovered by the enrollee device 300.

The registrar device 302 receives the probe request and finds the enrollee information element 514. The registrar device 302 responds with a probe response frame containing a registrar information element 518. The probe response is sent with type of network as "ad hoc" so as not to confuse the Basic Service Set (BSS).

The registrar information element 518 includes capability information of the registrar device 302, such as: an identifier indicating that the probe response is a discovery response; the supported rate set of the registrar device 302; the supported security capability; and information about out of band channel if supported and enabled on the registrar device 302. In addition, the registrar information element 518 may include a request type field, which indicates whether the discovery response also includes a control channel request. As an example, this may be a bit that is set to 0 for discovery only response and 1 for discovery as well as control channel setup response. A status code field may also be provided, and may be, for example, set to 0 for successful setup of control channel state and set to error code for failure to setup control channel state.

In this example, if the Request Type field=1, the registrar device 302 creates state for the enrollee device 300 with the matching capability set and opens an L2 data port for setup only exchange with the enrollee device 300 (e.g., by using a specific pattern like specific Ether Type for such traffic and all other data traffic is blocked from transmission and reception). The registrar device 302 also aggressively ages the state and brings down the port if it does not receive any response from the enrollee device 300 or fails setup with the enrollee device 300, for example after a preset time limit.

The access point 306 may also respond to the probe request sent by the enrollee device 300. If the access point 306 does not support the setup features described herein (i.e., the access point 306 is a "legacy device"), then the access point 306 does not understand the enrollee information element 514 in the probe request frame and ignores it (since the IEEE 802.11 standard requires a wireless device to skip any information element that it does not understand). In this case, the access point 306 does respond with a probe response but without the registrar information element 518.

If, on the other hand, the access point 306 does support the setup features, then the access point 306 finds the enrollee information element 514 in the probe request frame and responds with a probe response frame containing a registrar information element 518, which may include whether the access point 306 is a registrar device or a proxy for a registrar device, and additional capabilities of the access point, such as are set out for the registrar information element 518 previously described in this example.

If a probe request received by the access point 306 includes a Request Type=1, then the access point 306 may handle as described above with respect to the registrar device 302. If the enrollee device 300 sets the Request Type=0, then the access point 306 simply receives all probe responses with or without a registrar information element 518 and completes discovery only process. If the enrollee device 300 sets Request Type=1 and if it receives the probe response from the registrar device 302 then by default (or unless overridden by upper layer settings or user) it prefers a registrar device 302 over an access point 306 as a registrar or proxy to registrar and tries the access point 306 only if it can not successfully perform setup with a registrar device 302. In this situation, the enrollee device 300 first creates state for the registrar device 302 with the matching capability set and opens an L2 data port for only setup traffic exchange with the registrar device 302 (e.g., again by using a specific pattern like specific Ether Type for such traffic and all other data traffic is blocked from transmission and reception). Enrollee may also aggressively age the state and brings down the port if it does not receive any response from the registrar device 302 or fails Easy Setup with the registrar device 302.

In an embodiment, if the enrollee device 300 cannot successfully perform setup with the first registrar device 302 and it received probe responses from multiple registrar devices 302, then the enrollee device 300 tries additional registrar devices 302 sequentially (e.g., by using some heuristic for the order) until the enrollee device 300 succeeds or exhausts the list, in which case it tries the access point 306 if the access point 306 also responded as a registrar or proxy to registrar. If the enrollee device 300 fails here as well or if the access point 306 is a legacy device then the enrollee device 300 moves to the next candidate access point for the desired network and repeats the same steps. If the enrollee device 300 also exhausts a list of candidate access points, then the enrollee device 300 declares setup failure for the desired network.

Using the L2 data port as a control channel as open for only setup traffic exchange provides many benefits. Doing so decouples actual setup exchange from the specific wireless technology, which means the same exchange could be used for other wireless technologies. In addition, using the L2 data port requires minimal changes to wireless technology protocol, for example, for 802.11, there is minimal change to syntax and semantics.

Also, using this exchange method architecturally enables one logical or physical entity to perform setup for any wireless technology. Additionally, setup state is a well known state to the wireless stack and platform which enables any wireless stack to uniformly manage this state and further enables integration of this state with other system components like group policy, diagnostics, etc. In addition, using this exchange gives system wide visibility into setup progress; i.e. each L2 data port refers to a specific registrar device 302 or an access point 306 acting as a registrar or proxy to a registrar, and there is a clean state transition whether it is from tearing down current a L2 data port for actual data and creating a new one for setup, or tearing down a L2 data port for setup and creating a new one for actual data using the credentials acquired after setup is complete.

Using this method also represents out of band channel in the same way as in band channel. Finally, the methodology is extensible, which means a new setup exchange can be easily provided in the future on top of the same L2 data port representation of the control channel for personal as well as enterprise setup scenarios. For enterprise setup scenario, L2 data port model gels well with 802.1X protocol as 802.1X packets are also carried in 802.11 data packets (with a different Ether Type).

The logical or physical entity for setup on the enrollee device 300 performs handshake with its peer entity on the registrar device 300 or an access point 306 acting as a registrar or proxy to a registrar. From hereon in this example, the logical or physical entity for setup on the enrollee device 300 (e.g., the discovery module 510 and/or the registration module 512) is called an "enrollee device setup entity," the peer entity on the registrar device 300 and access point 306 acting as a registrar (e.g., the registration component 502) is called a "registrar device setup entity," and a peer entity on a device acting as proxy to a registrar device 302 is called "registrar proxy device setup entity".

An enrollee device setup entity transmits and receives setup frames directly (i.e. at 1-hop) with a registrar device setup entity or directly with registrar proxy device setup entity through the L2 data port opened for setup exchange. It is the job of the specific wireless stack to encapsulate and de-capsulate setup frames in its media specific data frames.

The registrar device setup entity transmits and receives setup frames directly (i.e. at 1-hop) with enrollee device setup entity through the L2 data port opened for setup exchange. Again, it is the job of the specific wireless stack to encapsulate and de-capsulate setup frames in its media specific data frames.

The registrar device setup entity transmits and receives setup frames with the registrar proxy device setup entity as L4/L3 packets, for example a UDP packet encapsulating a UPnP message. It is the job of the registrar device setup entity to manage the L4/L3 pipe for such messages.

The registrar proxy device setup entity transmits and receives setup frames directly (i.e. at 1-hop) with enrollee device setup entity through the L2 data port opened for setup Exchange. Again, it is the job of the specific wireless stack to encapsulate and de-capsulate setup frames in its media specific data frames.

The registrar proxy device setup entity transmits and receives setup frames with registrar device setup entity as L4/L3 packets. It is the job of registrar proxy device setup entity to manage L4/L3 pipe for such messages.

On the enrollee device 300, when the 802.11 stack indicates L2 data port up for setup exchange, the enrollee device setup entity sends a setup message (for example a key message) on the L2 data port. It is up to the manufacturer of the enrollee device 300 to decide what goes out in setup message and when to invoke user for interactive input.

The 802.11 stack encapsulates the setup message in an 802.11 data packet and based on peer type for the L2 data port, fills the 802.11 header before transmitting it on air. For example, if the peer type for the L2 data port is an access point 306 either in registrar or proxy to registrar role, then packet addresses in the 802.11 header are: source—MAC address of the enrollee device 300; destination—MAC address of the access point 306; BSSID=BSSID of the access point 306. A FromDS bit is set to 0 and TODS bit is set to 1 in the 802.11 header. If the peer type for the L2 data port is a registrar device 302 or a proxy for a registrar device, the settings are the same except the ToDS bit is set to 0. These settings ensure that the targeted registrar device 302 receives the packet. The registrar device 302 should temporarily either enable 802.11 promiscuous-mode or disable matching of sender's address to be able to directly receive an 802.11 data packet not sourced from its access point 306.

The 802.11 stack on the peer receives the packet, strips off the 802.11 header, and indicates the setup message on the L2 data port corresponding to the sender of the received packet. If the peer is a registrar device setup entity, then it locally consumes the received packet and sends a setup message on the L2 data port corresponding to the sender of the received packet. Here as well, it is up to the manufacturer to decide what goes out in setup message and when to invoke a user for interactive input.

If the peer is a registrar proxy device setup entity, then it forwards the received packet using a L4/L3 channel to a registrar device setup entity and on getting a response from a registrar device setup entity, sends a setup message on the L2 data port corresponding to the sender of the received packet that it proxies. It is up to the registrar proxy device setup entity and a registrar device setup entity to devise the L4/L3 pipe to proxy requests/responses, decide what goes out in these L4/L3 messages, and when to invoke a user for interactive input.

For both situations above, the 802.11 stack encapsulates the setup message from a registrar device setup entity and the registrar proxy device setup entity, respectively, in an 802.11 data packet and based on its current operation mode with respect to the peer for the L2 data port, fills the 802.11 header as mentioned below before transmitting it on air. For example, if the 802.11 stack is in access point mode (either in registrar or proxy to registrar role) with respect to the peer for the L2 data port, then packet addresses in the 802.11 header are: source—MAC address of the access point 306; destination—MAC address of the enrollee device 300; BSSID=BSSID of the access point 306. The FromDS bit is set to 1 and TODS bit is set to 0 in the 802.11 header. These settings ensure that the targeted enrollee device 300 directly receives the packet. If the 802.11 stack is in a client mode, either as a registrar device 302 or a proxy thereto, then the settings are the same except that the FromDS bit is set to 0. These settings also ensure that the targeted enrollee device 300 directly receives the packet.

The 802.11 stack on the enrollee device 300 receives the packet, strips off the 802.11 header, and indicates the setup message on the L2 data port corresponding to the sender of the received packet. The enrollee device setup entity locally consumes the received packet and the setup exchange continues this way. At some later point in the exchange, the enrollee device setup entity and a registrar device setup entity acquire the key successfully or fail to acquire one (explicit code as well as timeout).

If the key was acquired successfully then from that point on, for the rest of setup exchange, except for a message header that is needed for translating L2 setup packet into L4/L3 setup packet at a proxy to the registrar device 302, the rest of message payload is encrypted and integrity protected using some encryption methods where encryption and integrity protection is applied end to end between the enrollee device setup entity and a registrar device setup entity. The underlying 802.11 stack is completely unaware of such encryption and integration protection including the encryption methods used by the two entities. Finally, setup exchange terminates with success or failure (explicit code as well as timeout).

After this process, if setup fails, then on the enrollee device 300, the enrollee device setup entity requests the 802.11 stack to delete the L2 data port and create a new one with the next setup peer for the desired network. The 802.11 stack deletes the specified port and either creates another one or exhausts the peer list and indicates failure for the desired network. The failure indication is system wide and it is up to the enrollee device setup entity to represent the failure to the user.

On the registrar device 302, a registrar device setup entity requests the 802.11 stack to delete the L2 data port. The 802.11 stack simply deletes the specified port.

On a proxy for a registrar device 302, the registrar proxy device setup entity requests the 802.11 stack to delete the L2 data port. The 802.11 stack simply deletes the specified port.

If the setup succeeds, then on the enrollee device 300 the enrollee device setup entity requests the 802.11 stack to delete the L2 data port. The 802.11 stack simply deletes the specified port. Then the enrollee device setup entity configures the 802.11 stack with an 802.11 profile and credentials to connect the enrollee device 300 as a member of the 802.11 network domain. The 802.11 stack uses the configured profile and credentials to connect to the 802.11 network domain. On a registrar device 302 or a proxy thereto, a registrar device setup entity (or registrar proxy device setup entity) requests the 802.11 stack to delete the L2 data port. The 802.11 stack simply deletes the specified port.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer storage medium having thereon computer-executable instructions for performing a method comprising:
   on a wireless enrollee device,
      broadcasting over a wireless network
         information about the device and
         information about one or more methods for receiving configuration information;
      receiving configuration information via one of said one or more methods from an additional device already in communication with the wireless network wherein the additional device
         reviews the information about the enrollee device;
         reviews information about one or more methods for receiving;
         displays the information on the additional device; and
         allows a selection to be made to invite the enrollee wireless device to join the wireless network; and
      utilizing the configuration information communicated from the additional device, attempting to connect to the wireless network.

2. The computer storage medium of claim 1, wherein the broadcasting occurs via a channel that is not encrypted and not protected.

3. The computer storage medium of claim 1, wherein the wireless network is a Wi-Fi wireless network, and wherein the broadcasting occurs via management frames of the Wi-Fi wireless network.

4. The computer storage medium of claim 3, wherein the receiving occurs via at least one of management frames and temporarily established data connection frames of the Wi-Fi wireless network.

5. The computer storage medium of claim 3, wherein the receiving configuration information occurs via an out of band exchange.

6. The computer storage medium of claim 1, wherein the wireless network is a Wi-Fi wireless network, and wherein the receiving configuration information occurs via at least one of management frames and temporarily established data connection frames of the Wi-Fi wireless network.

7. The computer storage medium of claim 1, wherein the receiving configuration information occurs via an out of band exchange.

8. The computer storage medium of claim 1, wherein the method comprises use of a PIN, and wherein the enrollee wireless device provides the PIN via a user interface.

9. The computer storage medium of claim 1, wherein the method comprises use of a PIN, and wherein PIN is provided on the enrollee wireless device.

10. The computer storage medium of claim 1, having further computer-executable instructions comprising reporting failure conditions or successful results after attempting to connect to the wireless network.

11. A computer storage medium having thereon computer-executable instructions for performing a method comprising:
on a device connected to a wireless network,
receiving over the wireless network
information about an enrollee wireless device attempting to connect to the wireless network and information about a method for providing configuration information to the enrollee wireless device;
reviewing the information about the enrollee device;
reviewing information about one or more methods for receiving;
displaying the information on the device connected to the wireless network;
allowing a selection to be made to invite the enrollee wireless device to join the wireless network and
if the enrollee wireless device has been selected to join the wireless network,
providing configuration information via the method for providing configuration information.

12. The computer storage medium of claim 11, wherein the receiving occurs via a channel that is not encrypted and not protected.

13. The computer storage medium of claim 11, wherein the wireless network is a Wi-Fi wireless network, and wherein the receiving occurs via management frames or a temporarily established data connection frames of the Wi-Fi wireless network.

14. The computer storage medium of claim 13, wherein the providing configuration information occurs via management frames or a temporarily established data connection frames of the Wi-Fi wireless network.

15. The computer storage medium of claim 13, wherein the providing configuration information occurs via an out of band exchange.

16. The computer storage medium of claim 11, wherein the wireless network is a Wi-Fi wireless network, and wherein the providing configuration information occurs via at least one of management frames or temporarily established data connection frames of the Wi-Fi wireless network.

17. The computer storage medium of claim 11, wherein the providing configuration information occurs via an out of band exchange.

18. The computer storage medium of claim 11, further comprising, comparing the information about the enrollee device against a list of approved devices, and if the information matches is consistent with an item on the list, automatically providing configuration information via the method.

19. The computer storage medium of claim 11, further comprising, providing an alert in response to receiving the information.

20. The computer storage medium of claim 11, further comprising requesting entry a PIN by the user, the PIN being supplied by the enrollee wireless device.

21. A computer storage medium having thereon computer-executable instructions for performing a method comprising:
on a wireless enrollee device,
broadcasting over a wireless network information about an ad hoc conference, the information comprising a PIN number for the conference,
the broadcasting occurring via at least one of
management frames and
temporarily established data connection frames, and
the information being included in the management frames;
receiving configuration information for connecting to the ad hoc conference at an additional device in communication with the wireless network wherein the additional device
reviews the information about an ad hoc conference including the PIN number for the conference and displays the information on the additional device;
allows a selection may be made on the additional device to invite the enrollee wireless device to join the wireless network; and
utilizing the configuration information, attempting to connect the enrollee device to the conference.

22. A computer storage medium having thereon computer-executable instructions for performing a method comprising:
on a device connected to a wireless network,
receiving over the wireless network
information about an enrollee wireless device attempting to connect to the wireless network and information about a method for receiving configuration information;
evaluating the device against a list of enrollees;
if the device is on the list of enrollees, providing configuration information to the device via the method;
if the device is not on the list of enrollees, displaying
the information about the enrollee wireless device attempting to connect to the wireless network and information about a method for receiving configuration information;
allowing a selection to allow the enrollee device to join the wireless network;
if the selection is made to allow the enrollee device to join the wireless network, providing configuration information to the device via the method.

23. The computer storage medium of claim 22, wherein each of the enrollees on the list of enrollees have a unique identification.

24. The computer storage medium of claim 23, wherein the unique identification of each enrollee consists of a MAC address or static IP address or a name.

25. The computer storage medium of claim 24, wherein the enrollee and the registrar can communicated directly with an in band connection.

* * * * *

UNITED STATES PATENT AND TRADEMARK OFFICE
CERTIFICATE OF CORRECTION

PATENT NO. : 7,616,594 B2 Page 1 of 1
APPLICATION NO. : 11/143385
DATED : November 10, 2009
INVENTOR(S) : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Nineteenth Day of October, 2010

David J. Kappos
*Director of the United States Patent and Trademark Office*